C. DAY.
GRAIN SEPARATOR.
APPLICATION FILED SEPT. 23, 1913.
1,124,873.
Patented Jan. 12, 1915.
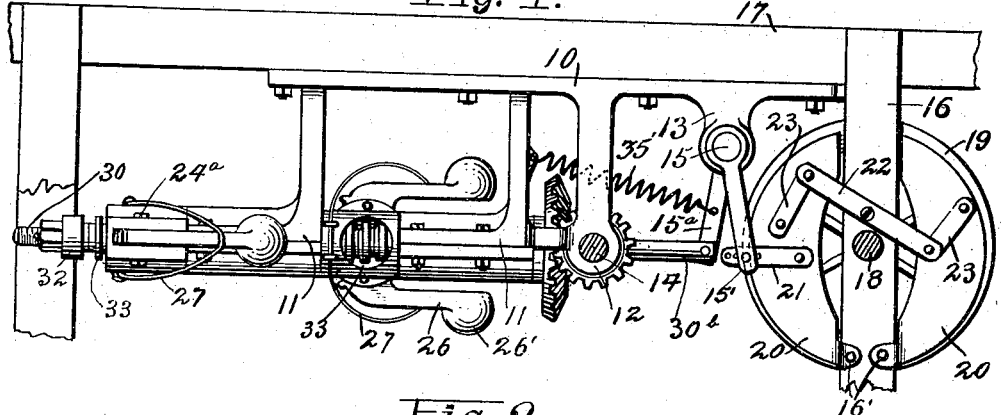
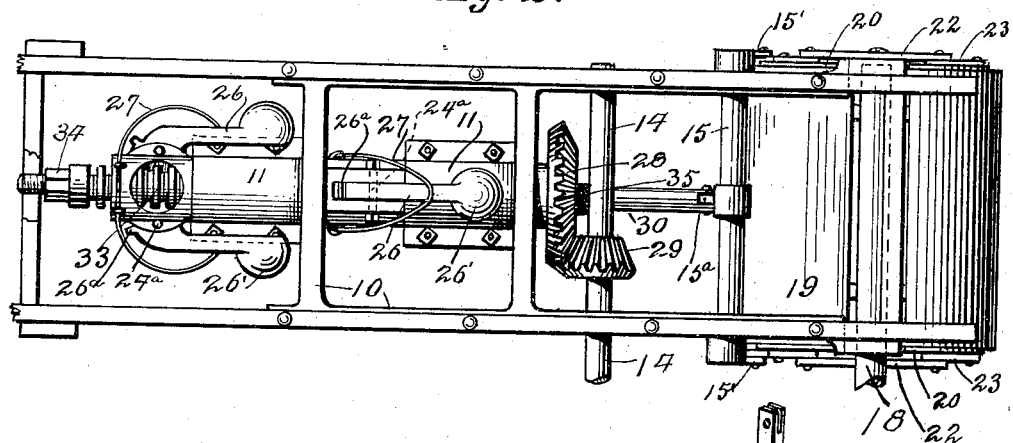
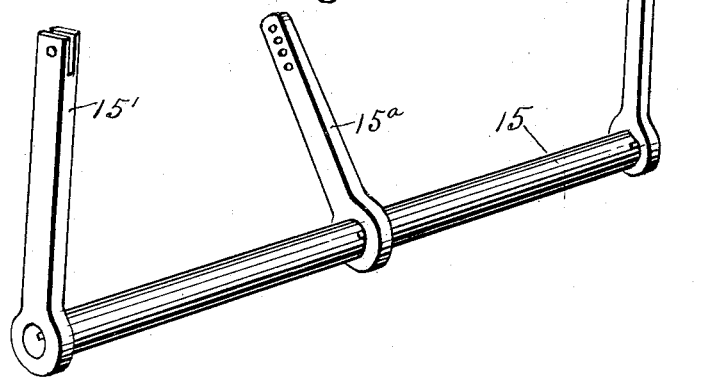
Witnesses
R. H. Berry
Emma Shaffer
Inventor
Cleveland Day.
Sterling P. Buck. Attorney ly, for the sake of clarity. Fig.
UNITED STATES PATENT OFFICE.

CLEVELAND DAY, OF RAYVILLE, LOUISIANA.

GRAIN-SEPARATOR.

1,124,873.  Specification of Letters Patent.  Patented Jan. 12, 1915.

Application filed September 23, 1913. Serial No. 791,303.

*To all whom it may concern:*

Be it known that I, CLEVELAND DAY, a citizen of the United States, residing at Rayville, in the parish of Richland and State of Louisiana, have invented a new and useful Improvement in Grain-Separators, of which the following is a specification.

This invention relates to grain separators, and it more particularly relates to wind blast regulators.

One of the objects of the invention is, to provide for automatically regulating the volume of air passing through the fan of a grain separator, by means of a governor which is directly connected to the shutters of the fan casing, and operatively connected to the threshing mechanism.

Another object of the invention is to provide an improved form of governor and an improved form of connection between the governor and the shutters; so that the operation of the shutters is substantially simultaneous with whatever change of speed may take place in the threshing mechanism.

Another object of the invention is to provide an improved form of double-acting governor, which is disposed on a horizontal axis, in the most convenient and only available position and location to attain the best results in the work it is here designed to accomplish.

A further object is to provide an improved form of governor axle, which is provided with removable tooth-engaging rings, the bosses of which may be quickly filed, ground, or turned off, so as to reduce the space between the spaced elements thereof, for taking up lost motion, and thereby assuring perfect and instantaneous action of the governor.

Another object is to generally improve and simplify devices of this character and to reduce the expense of manufacture to the minimum.

In the accompanying drawings, which supplement this specification,—Figure 1 is a side elevation view of the device which constitutes my invention; Fig. 2 is a top plan view thereof, the spring 35' being eliminated, for the sake of clearness. Fig. 3 is a perspective view, enlarged, of the rocker shaft and connecting arms.

Referring to these drawings, in which similar reference characters designate similar parts, throughout the several views; the governor frame 10 is provided with bearings 11 which carry the governor, and also with bearings 12 and 13 which carry the shafts or axles 14 and 15, respectively.

A hanger or bearing 16 is provided on the main frame 17, which constitutes a part of the thresher mechanism, and a rotary shaft 18 constitutes an element of the fan which is inclosed by the fan-casing 19, of ordinary construction; shutters 20 being provided at the opposite ends thereof. By this fan the chaff and straw are separated from the grain, in a manner well known by those who are familiar with the art; the shaft 18 being rotated by its connection with the threshing mechanism (not shown); the shaft 14 being also adapted to be connected to the threshing mechanism in any proper way.

The rocker shaft 15 carries radial arms 15' at its opposite ends, and these arms are each connected to one of the shutters 20 by one of the links 21, pivotally connected to said shutter, and adjustably connected to the arm 15' by a movable pivot member. The shutters are preferably crescent shaped, and are pivotally connected to the hanger 16 at 16'; while their upper ends are adapted to be swung apart by means of a balanced connecting lever 22, links 23, and the link 21; the lever 22 being pivoted medially to the hanger 16, and the links 23 each having one end pivoted to the lever 22 and its other end pivoted to one of the shutters, so that the said shutters are coöperatively connected together, so as to be operated in unison and with minimum resistance.

The double-acting governor is rotatably supported by the hangers 11, and comprises a tubular journal or main governor sleeve 24, a longitudinally movable governor shaft 25, governor-arms 26, governor springs 27 and a gear wheel 28, the latter meshing with a gear wheel 29, on the shaft 14. The governor arms are each provided with a ball or weight 26' at one end, and with teeth 26ª at its other end. The tubular journal 24 is apertured medially and at one end, and the toothed ends of the governor arms 26 are pivotally connected at 24ª to this member 24 and extended through the apertures into the axial bore thereof. There are two pairs of governor arms 26, each pair of which is disposed in a radial plane at right angles to the plane of the other pair, and the springs 27 serve to normally hold the governor arms substantially in axially parallel relation and to counteract gravity when the respective arms are turned into depending position. The governor shaft comprises two series of annular teeth or rings 33; said rings being demountably secured on the rod 30 by a nut 34, on the screw-threaded end of the rod, and thereby held tightly between said nut and a shoulder of the rod, not shown. This rod may be screw-threaded, for holding an adjusting nut 35, the apertured end 30$^b$ of the shaft being loosely pivoted to an arm 15$^a$, fixedly secured on the shaft 15. The teeth or spaced annular ridges 33 of the governor shaft engage with the teeth 26$^a$ of the governor arms 26 and coact therewith for reciprocating the governor shaft as the speed of the threshing mechanism alternately increases and decreases; so as to oscillate the shaft 25 and coact therewith and with the elements, 15', 21, 22 and 23, for imparting opening and closing movements to the shutters, in an obvious manner, instantly and simultaneously with the movements of the governor arms. When the teeth 26$^a$ and the rings 33 have become worn to such an extent as to cause lost motion of the governor arms, the rings may be removed from the rod 30 and have their bosses dressed off, so as to lessen the distance between the ridges thereof; and after thus adjusting the rings, the nut 34 is seated farther inward of the rod. A spring 35' is secured to the arm 15$^a$ and to one of the hangers 11 for assisting the springs 27 in holding the governor shaft in its normal position, and co-acting with the governor shaft for holding the shutters in their normal open position. The normal position of the shutters may be adjusted by means of the nut or collar 35, or by changing the pivotal connection of the arm 15' and the link 21.

From the foregoing description, it will be seen that when the speed of the threshing machine increases, the shutters are moved proportionately toward their closed position; so that the volume of air passing through the fan is diminished; but when, because of an excess of grain and straw passing through the threshing machine, the speed thereof is lessened, the volume of air through the fan casing is increased.

It will be seen that I have provided an air or draft regulating device of this character which is fully capable of attaining the desired objects set forth in the preceding paragraphs.

While I have illustrated and described what I now consider the preferable embodiment of my invention, it is to be understood that the invention is not limited to these exact details of construction, combination and arrangement of parts; it is only limited by a reasonable interpretation of the claim.

I claim:

The combination in a grain separating mechanism, of a main frame comprising a pair of horizontal beams, a fan casing supported by the main frame, a horizontal axle journaled within the fan casing and carrying a fan, a governor frame secured to and depending from the main frame, a governor carried by said governor frame and comprising a horizontal axle mounted at right angles to the first said horizontal axle and approximately on the same horizontal plane therewith, said governor axle comprising a central and longitudinally movable rod, a horizontal rocker shaft mounted in a plane above said axles and having depending arms, a pair of shutters for the fan casing, said pair of shutters being operatively connected together so as to move in unison, a link connecting one of said depending arms of the rocker shaft with one of said shutters, and the other said arm of the rocker shaft being pivotally connected to said longitudinally movable rod of the governor and being thereby adapted to be actuated for actuating the said shutters.

In testimony of the foregoing I hereby affix my signature in the presence of two witnesses.

CLEVELAND DAY.

Witnesses:
R. C. NORWOOD,
A. A. ABELL.